US006757434B2

(12) United States Patent
Miled et al.

(10) Patent No.: US 6,757,434 B2
(45) Date of Patent: Jun. 29, 2004

(54) REGION-OF-INTEREST TRACKING METHOD AND DEVICE FOR WAVELET-BASED VIDEO CODING

(75) Inventors: Mohamed Khames Ben Hadj Miled, East Boston, MA (US); Fehmi Chebil, Irving, TX (US)

(73) Assignee: Nokia Corporation, Espoo (FI)

( * ) Notice: Subject to any disclaimer, the term of this patent is extended or adjusted under 35 U.S.C. 154(b) by 77 days.

(21) Appl. No.: 10/293,976

(22) Filed: Nov. 12, 2002

(65) Prior Publication Data
US 2004/0091158 A1 May 13, 2004

(51) Int. Cl.[7] .............................................. G06K 9/36
(52) U.S. Cl. ..................... 382/236; 382/240; 382/294; 348/472; 348/699
(58) Field of Search ................................ 382/294, 240, 382/236, 302; 375/240.12, 240.08, 240.23; 348/472, 699; 360/32

(56) References Cited

U.S. PATENT DOCUMENTS

| | | | | |
|---|---|---|---|---|
| 5,079,630 A | * | 1/1992 | Golin et al. | ........... 375/240.08 |
| 5,974,192 A | | 10/1999 | Kundu | ........................ 382/260 |
| 6,014,181 A | * | 1/2000 | Sun | ............................. 348/699 |
| 6,035,067 A | | 3/2000 | Ponticos | ...................... 382/226 |
| 6,421,463 B1 | | 7/2002 | Poggio et al. | ............... 382/224 |
| 6,654,502 B1 | * | 11/2003 | Aldrich et al. | ............... 382/236 |

FOREIGN PATENT DOCUMENTS

| | | | | |
|---|---|---|---|---|
| EP | 0720377 | * | 7/1996 | ............. H04N/7/26 |
| JP | 406034651 A | * | 2/1994 | ........... G01P/13/00 |
| WO | WO 98/43436 | * | 10/1998 | ............. H04N/7/36 |

OTHER PUBLICATIONS

Oh et al., A New Block–Matching Algorithm Based on an Adaptive Search Area Adjustment Using Spatio–Temporal Correlation IEEE, Transactions on Consumer Electronics, vol. 45, No. 3, 8–1999, pp. 745–752.*

"Efficient Region Tracking with Parametric Modesl of Geometry and Illumination", G. Hager et al., IEEE Transactions on Pattern Analysis and Machine Intelligence, vol. 20, No. 10, Oct. 1998.

"Wavelet Subspace Method for Real–time Face Tracking", V. Krueger et al., Proc. Pattern Recognition, 23rd DAGM Symposium, Munich Germany 2002.

* cited by examiner

*Primary Examiner*—Anh Hong Do
(74) *Attorney, Agent, or Firm*—Ware, Fressola, Van Der Sluys & Adolphson LLP (57) ABSTRACT

A method and device for tracking a region-of-interest in a sequence of image frames, wherein the boundary of the target region of a previous frame is projected onto the current frame so that a search area in the current frame can be established. For every pixel in the search area in the current frame, a search window is established in the previous frame so as to find a matched pixel within the search window. If the matched pixel is within the ROI of the previous frame, then the corresponding pixel in the current frame is preliminarily considered as a pixel within the ROI of the current frame. This backward matching is carried out using a low pass subband in the wavelet domain. The preliminary ROI in the current frame is then refined using edge detection in a high frequency subband.

22 Claims, 5 Drawing Sheets

REGION-OF-INTEREST TRACKING METHOD AND DEVICE FOR WAVELET-BASED VIDEO CODING

FIELD OF THE INVENTION

The present invention relates generally to subband decomposition-based image codecs and, more particularly, to the coding of a moving object over a series of images.

BACKGROUND OF THE INVENTION

It is generally known that image compression is effective in reducing the amount of image data for transmission or storage. In particular, with the introduction of scalable image coding formats like the JPEG2000, it has become possible to send and receive only a fraction of the image file and still reconstruct a high-quality image at the receiving end. The part that is dropped from the image usually contains information that describes the high-frequency components present in the image, corresponding to the details that the human visual system (HVS) is not very sensitive to.

JPEG stands for Joint Photographic Experts Group for image compression. In 1988 this committee adopted its first standard, known as the JPEG baseline, which is based on discrete cosine transform (DCT) and on Huffman coding. In 2001, the JPEG committee developed a new compression standard, named JPEG 2000. This new standard provides low bit-rate operation, with rate-distortion and subjective image quality performance superior to existing standards, without sacrificing performance at other points in the rate-distortion spectrum. More importantly, JPEG 2000 allows extraction of different resolutions and pixel fidelities of a compressed image from the same codestream representation. It also offers features such as region-of-interest (ROI) coding and random access to image areas. This allows a user to manipulate, store or transmit only the essential information of an image for any target device from its JPEG2000 bitstream representation.

JPEG2000 is a subband decomposition-based bit-plane coders. It uses wavelets at the transform stage. The image is decomposed to multiple resolutions. Each resolution is composed of subbands representing low or/and high frequency components. The samples in the subbands are then coded in bit-planes starting from the most significant bit-plane. The usage of the wavelet transform and the bit-plane coding scheme provide the scalability feature of JPEG 2000.

Motion JPEG 2000 is a method of video compression, based on intra-frame coding using JPEG 2000. In Motion JPEG 2000, frames in video sequences are coded as independent images, i.e., there is no motion prediction between the images. This coding scheme offers important functionalities such as scalability in quality and in resolution, robustness to bit errors, and frame editing. However, it is inefficient in compression performance as compared to other standards, such as MPEG-4, where estimates of motion vectors are used to code inter-frames. On the other hand, the compression performance of Motion JPEG 2000 can be improved using the features of JPEG 2000 such as ROI coding.

ROI coding is a useful functionality in JPEG 2000. It allows the allocation of more bits in an ROI than in other regions in the same image while coding it. By unequally coding the parts of the images so that important objects can be assigned more bits per pixel than the less important objects, a better visual perception of the sequence is obtained, making this feature very useful especially in low data-rate applications. To code important objects in a video sequence as ROIs, tracking of these objects becomes essential for producing a high-quality video stream.

Tracking of ROIs is an important feature in many visual-related applications, such as vision-based control, human-computer interfaces, surveillance, agricultural automation, medical imaging and visual reconstruction. The main difficulty in ROI tracking in video sequences is due to the potential variations in the target region within the frame sequence. These variations are usually due to changes in pose, shape deformations, illumination and partial or full occlusion of the target. The sources of these variations should be taken into account when designing a tracking algorithm in order to guarantee robustness and stability.

In prior art, most of the ROI tracking methods rely on a multi-stage processing strategy, which consists of three consecutive steps. At the first step, color-based foreground segmentation is performed and areas of similar color as the target region are masked. The second step involves localizing the ROI through minimization of estimated vectors, using horizontal and vertical summing projections of the segmented image, or with heuristics based on size, shape, position, aspect ratio and color consistency of the target region. The final stage is refining and smoothing the region boundaries.

Hager et al. ("Efficient Region Tracking with Parametric Models of Geometry and Illumination", IEEE Transactions on Pattern Analysis and Machine Intelligence, Vol. 20, No. 10, Oct. 1998) makes use of linear models to simplify the optical flow equation, and a set of basis vectors to model the variation in illumination by performing singular value decomposition on a training sequence of the target. Kruger et al ("Wavelet Subspace Method for Real-time Face Tracking", Proc. Pattern Recognition, $23^{rd}$ DAGM Symposium, Munich, Germany 2002) uses a larger number of wavelet functions to construct a wavelet network representing the features of the target, and then tracks the ROI based on the Euclidean distance between the wavelet coefficients.

Kundu (U.S. Pat. No. 5,974,192) discloses a method for matching blocks in a sequence of images based on textures, dominant edge pixels as well as intensity and color. Ponticos (U.S. Pat. No. 6,035,067) discloses a method where a "potential well" is used for preventing large movements of the foreground object using predefined criteria for classifying image regions. Poggio et al (U.S. Pat. No. 6,421,463) discloses a method for searching objects in images where the search system must be trained using a wavelet coefficient template.

The major disadvantage of the prior art methods is computational complexity. Moreover, some of them require the tracking algorithm to be trained for ROI of the same type, color or shape.

Thus, it is advantageous and desirable to provide a method and device for arbitrary shape and type ROI tracking with a low computation complexity and memory cost suitable for Motion JPEG 2000 codecs.

SUMMARY OF THE INVENTION

It is a primary objective of the present invention to provide a method and device for tracking at least a portion of an object in a sequence of images, wherein the images are coded as individual images and no template and pre-trained objects are required for tracking. The objective can be achieved by combining boundary detection in the low-frequency band by pixel matching in the chrominance space and refinement of the detected boundary in the high-frequency band by edge analysis using the luminance component.

Thus, according to the first aspect of the present invention, there is provided a method of tracking a target region in an image frame based on a target region of a previous image frame in a sequence of image frames, each of said sequence of image frames comprising a plurality of pixels. The method is characterized by determining a search area in said image frame based on at least a part of the target region in said previous frame, said search area comprising a plurality of first pixels, each pixel having at least one corresponding first pixel value; and for the first pixels in the search area:
determining a further search area in said previous frame, said further search area including a plurality of second pixels among the plurality of pixels in the previous frames, each second pixel having at least one corresponding second pixel value and a region status;

finding a match between the first pixel value of said first pixels among the second pixel values for locating a reference second pixel; and determining the region status of at least one of said first pixels based on the region status of the reference second pixel for determining the target region in said image frame based on the region status of said at least one first pixel.

The region status of the second pixel is indicative of whether said second pixel is located within the target region in said previous frame.

Advantageously, said at least a part of the target region in the previous frame has a contour for defining a corresponding contour in said image frame, and the first pixels include pixels adjacent to the corresponding contour in said image frame.

Preferably, the first and second pixel values are indicative of at least one of the chrominance components of the wavelet coefficients in a low subband.

Advantageously, the target region of said image frame includes a boundary and said plurality of pixels in said image frame include a plurality of third pixels adjacent to the boundary, each third pixel having at least one corresponding third pixel value. The method is further characterized by determining the edge-type of the third pixels so as to modify the target region in said image frame based on the edge-type of the third pixels.

Preferably, the third pixel values are indicative of the luminance component of wavelet coefficients in a high subband.

According to the second aspect of the present invention, there is provided a computer program for use in an image coder having means for coding a sequence of image frames into a codestream, said sequence of image frames having at least one first image frame and a preceding second image frame, each of the first and second image frames having a plurality of pixels, wherein the second image frame has a target region. The computer program is characterized by a code for defining a search area in the first image frame based on at least a part of the target region in the second image frame, said search area comprising a plurality of first pixels, each pixel having at least one corresponding first pixel value; and a code for determining, for the first pixels in the search area:
a further search area in the second image frame, said further search area including a plurality of second pixels among the plurality of pixels of the second image frame, each of the second pixels having at least one corresponding second pixel value and a region status;

a reference second pixel in said further search area based on a match between the first pixel value of said first pixels among the second pixel values; and the region status of at least one of said first pixels based on the region status of the reference second pixel for determining a target region in the first image frame based on the region status of said at least one first pixel.

The region status of the second pixel is indicative of whether said second pixel is located within the target region in the second image frame.

Preferably, the first and second pixel values are indicative of at least one of the chrominance components of wavelet coefficients in a low subband.

Advantageously, the target region of the first image frame includes a boundary and said plurality of pixels in the first image frame include a plurality of third pixels adjacent to the boundary, each third pixel having at least one corresponding third pixel value. The computer program is further characterized by a code for determining the edge-type of the third pixels so as to modify the target region in the first image frame based on the edge-type of the third pixels.

Preferably, the third pixel values are indicative of the luminance component of wavelet coefficients in a high subband.

According to the third aspect of the present invention, there is provided an image encoder for coding a sequence of image frames comprising at least one first image frame and a preceding second image frame, each of the first and second image frames including a plurality of pixels, the second image frame having a target region, said image encoder having:

means for decomposing each of the image frames into a plurality of subband components; and means for coding the subband components into a codestream. The image encoder is characterized by a first algorithm, responsive to the subband components, for defining a search area in the first image frame based on at least a part of the target region in the second image frame, the search area including a plurality of first pixels, each having at least one corresponding first pixel value; and a second algorithm, responsive to the first pixels, for determining:
a further search area in the second image frame including a plurality of second pixels among the plurality of pixels in the second image frame, each second pixel having at least one corresponding second pixel value and a region status;

a reference second pixel in the further search area based on a match
between the first pixel value of the first pixels among the second pixel values; and a region status of at least one of the first pixels based on the region status of the reference second pixel for determining a target region in the first image frame based on the region status of said at least one first pixel.

Advantageously, the image encoder is adapted to code said target region in the first image frame with higher visual quality than another region in said first image frame.

According to the fourth aspect of the present invention, there is provided an image coding system having an encoder for coding a sequence of image frames into a codestream, and a decoder for reconstructing the sequence of image frames based on the codestream, wherein the sequence of image frames comprising at least a first image frame and a preceding second image frame, each of the first and second image frames comprising a plurality of pixels, the second image frame having a target region, said image encoder having:

means for decomposing each of the image frames into a plurality of subband components; and means for coding the subband components into the codestream. The image encoder is characterized by a first algorithm, responsive to the subband components, for defining a search area in the first image frame based on at least a part of the target region in the second image frame, the search area including a plurality of first pixels, each having at least one corresponding first pixel value; and a second algorithm, responsive to the first pixels, for determining:

a further search area in the second image frame including a plurality of second pixels among the plurality of pixels in the second image frame, each second pixel having at least one corresponding second pixel value and a region status;

a reference second pixel in the further search area based on a match between the first pixel value of the first pixels among the second pixel values; and a region status of at least one of the first pixels based on the region status of the reference second pixel for determining a target region in the first image frame based on the region status of said at least one first pixel.

The present invention will become apparent upon reading the description taken in conjunction with FIGS. 1 to 5.

BEST MODE TO CARRY OUT THE INVENTION

The ROI tracking method, according to the present invention, is designed for sequences to compress by Motion JPEG 2000. The method consists of two steps, carried out in low-resolution subbands in the wavelet domain. In the first step, an estimate of the target region in a current frame is performed by backward pixel matching based on the corresponding target region in the previous frame. Using the low frequency subband reduces the computational complexity and also introduces stability to the tracking. Backward pixel matching eliminates the need of assuming a model for motion. Preferably, the first step is carried out using the chrominance or chroma (U, V) components for tracking. Unlike luminance, the chrominance components are usually stable over the video sequence and have small variations. This makes the tracking algorithm more robust to changes in illumination, thereby eliminating the need for training sequences of the estimation of incident illumination. In the second step, the high-frequency subbands (i.e., HL and LH) of the luminance component Y are used to perform edge detection in order to refine the estimated target region in the current frame. The use of the Y component enables robust detection of edges even when the target region comes into contact with another region of the same color type.

Figure 1:
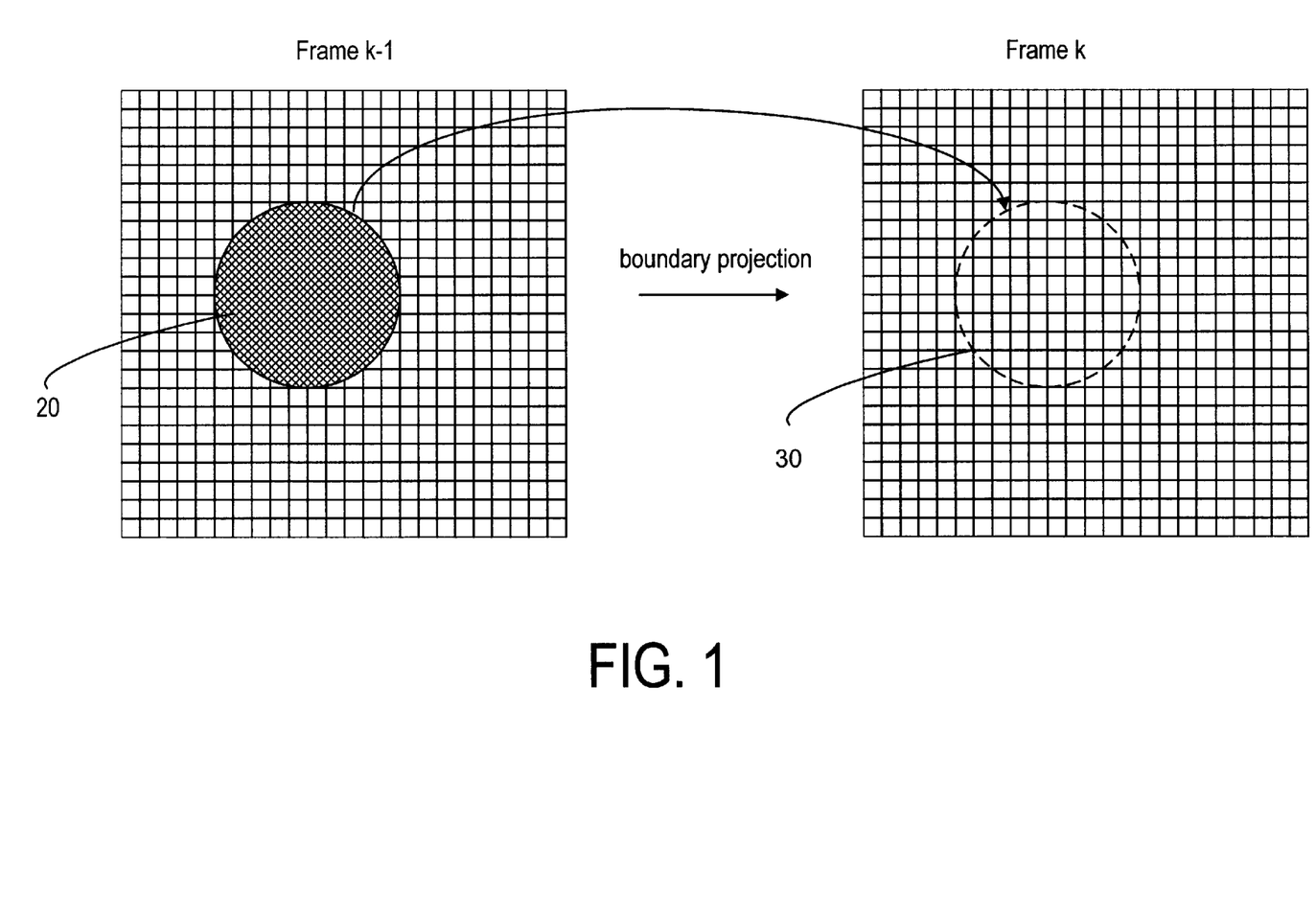
FIG. 1 is a schematic representation illustrating the projection of the boundary of a ROI in a previous image frame to the current image frame.
Figure 2:
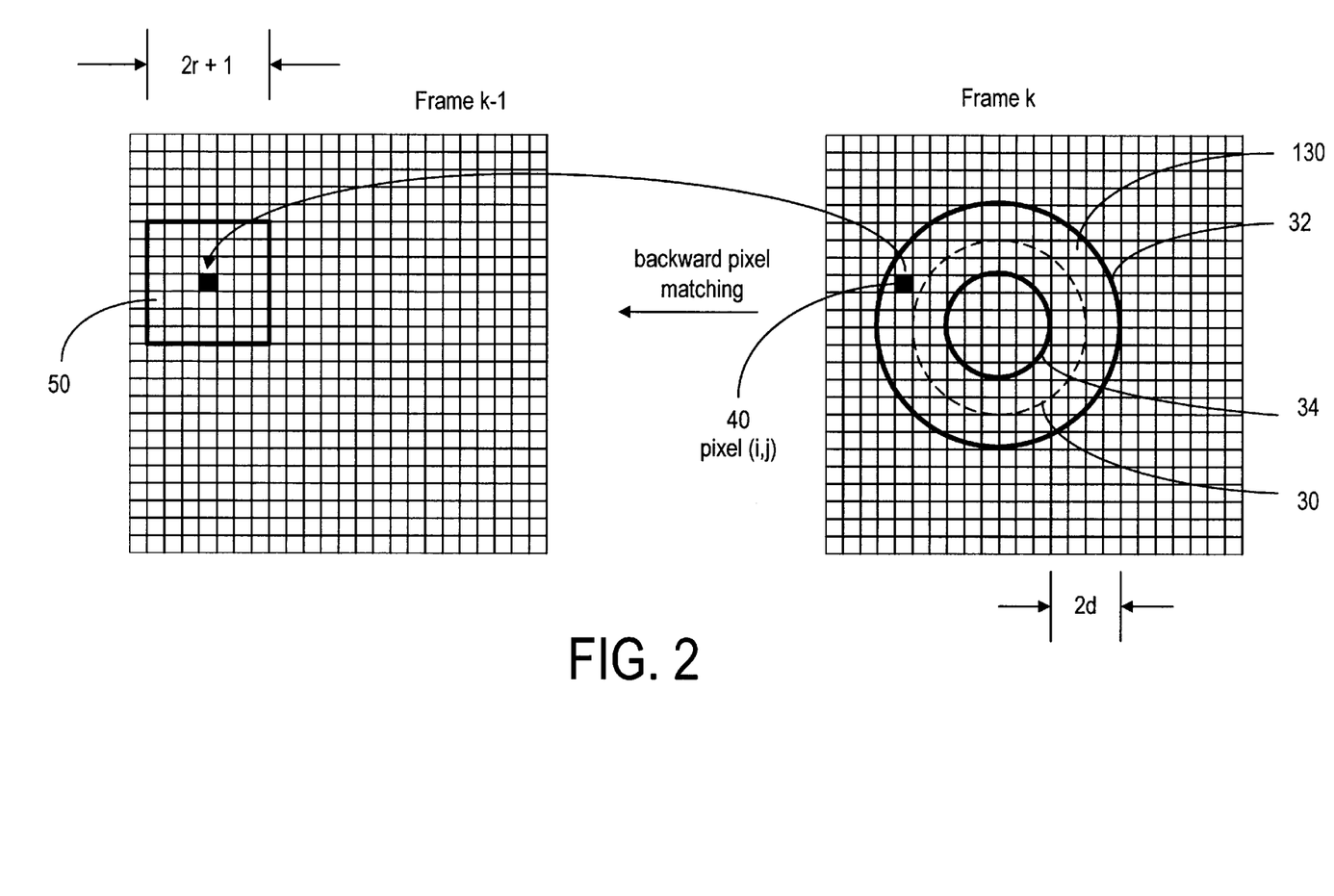
FIG. 2 is a schematic representation illustrating pixels in an area enclosing the projected ROI boundary in the current image frame being used for pixel matching purposes.

FIG. 1 illustrates the first step in the ROI search, according to the present invention, in order to obtain an estimated ROI boundary in a current image frame k. As shown in FIG. 1, the contour of a ROI 20 in an image frame (k-1) is projected onto the image frame k. Frame (k-1) is the previous frame. The projected contour 30 in frame k is shown as a dashed circle. A band of pixels bounded by an outer boundary 32 and an inner boundary 34 is used as a search area 130 in the current frame k. The width of the pixel band 130 is 2d. As shown in FIG. 2, the search area 130 represents the motion space of the contour of the ROI and d is an upper boundary on any displacement vector. Only the pixels within the search area 130, or the "relevant" pixels are backward matched based on the low pass wavelet coefficients of the chrominance components. It should be noted that the boundary of the ROI 20, represented by a circle, is for illustration purposes only. In general, the boundary or contour of a ROI is irregular in shape, and the search area 130 is occupied by a group of "relevant" pixels enclosing the projected ROI contour.

The backward pixel matching consists of mapping every "relevant" pixel to another pixel in the previous frame (k-1). The mapping criterion is the Euclidean distance between the low-pass wavelet coefficients of the chrominance components (U,V). This metric is minimized through a local search within a small window. As shown in FIG. 2, a pixel 40 in frame k is used to find a match within a search window 50 surrounding a corresponding pixel in frame (k-1). The area of the search window is given by $(2r+1)^2$, where r is an integer larger than or equal to d. If the pixel 40 is expressed as $x_k(i,j)$, then the search window 50 includes a set of pixels $x_{k-1}(p,q)$ where $(i-r) \leq p \leq (i+r)$, $(j-r) \leq q \leq (j+r)$. For every pixel in the search area 130 in frame k, a backward search is carried out in order to find a corresponding optimal pixel $x_{opt}$ in frame (k-1) within the search window 50. In particular, if $w_k$ is a low pass band of frame k and $w_{k-1}$ is the same low pass band of frame (k-1), then the optimal pixel $x_{opt}$ is defined as $$x_{opt} = \min_{p,q} |w_k(i, j) - w_{k-1}(p, q)|. \qquad (1)$$

As such, the search window 50 is a set of possible matches, and matching is achieved through the minimization of the Euclidean distances between $w_k(i, j)$ and $w_{k-1}(p, q)$, in terms of the chrominance components. Ignoring the luminance component Y makes the algorithm more robust to changes in illumination. It should be noted that the components $w_k(i, j)$ and $w_{k-1}(p, q)$ are related to the wavelet coefficients in chrominance space. If we denote the wavelet coefficients in the U space and V space as u and v, then w can be either u or v, or preferably, a 2D vector having values (u,v).

The following step in the ROI search is to find out the region status of each pixel $x_k(i,j)$—whether it belongs to background (non-ROI) of the image or to the ROI. The region status of pixel $x_k(i,j)$ depends on the region status of the corresponding pixel $x_{opt}$, which is known. Thus, if the optimal pixel in frame (k-1) is in the ROI, the corresponding pixel $x_k(i,j)$ is also set as being in the ROI. Similarly, if the optimal pixel in frame (k-1) is in the background, the corresponding pixel $x_k(i,j)$ is also set as being a background pixel. It should be noted that the ROI of the first frame in a sequence must be fed to the search algorithm, and the region status of each pixel inside and outside the first frame ROI can be marked accordingly.

Figure 3A:
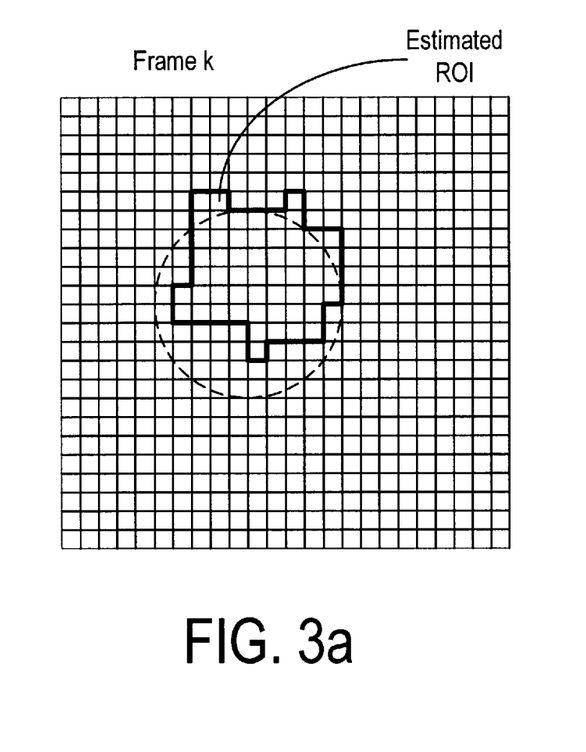
FIG. 3a is a schematic representation illustrating an estimated ROI in the current image frame.

Those pixels $x_k(i,j)$ within the search area 130 having the background status will be used to form a mask for defining an estimated ROI in frame k. FIG. 3a is a schematic representation of an estimated ROI in frame k after masking.

Preferably, a specified upper bound for the minimum Euclidean distance is used to determine whether the matching is successful. The specified upper bound can be set based on the average of the area intensity, for example. If $x_{opt}$ in Eq.1 is greater than the specified upper bound, then the region status of the pixel $x_k(i,j)$ corresponding the that $x_{opt}$ will be set as background.

Figure 3B:
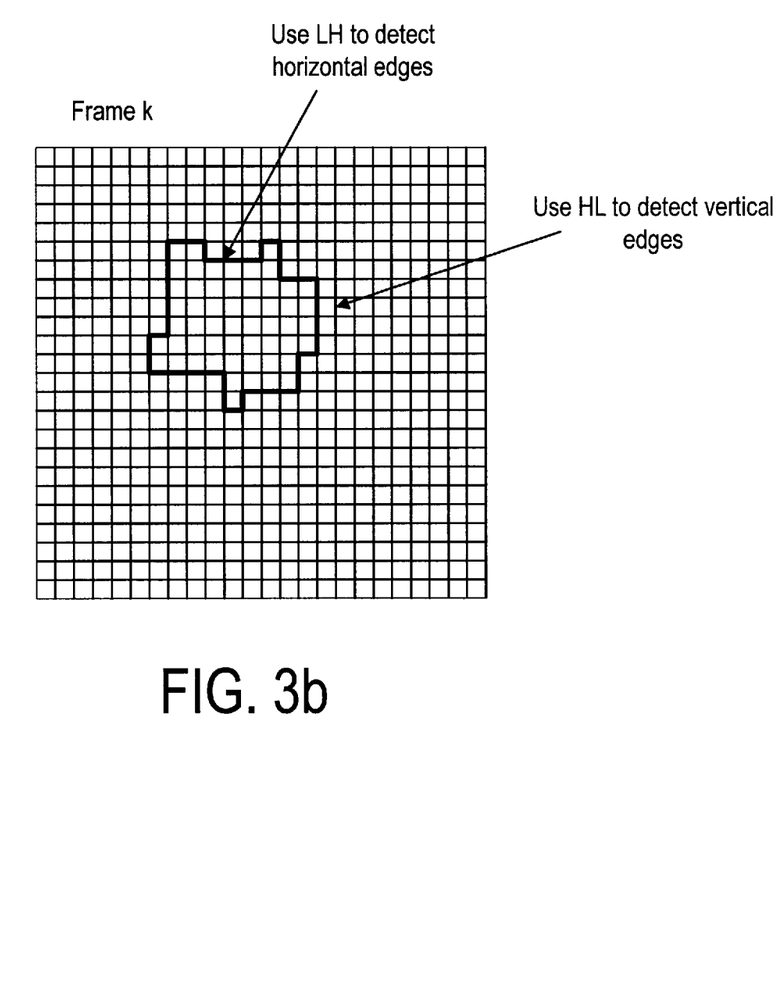
FIG. 3b is a schematic representation illustrating horizontal and vertical edge detection.

The next step is a tuning process, which is used to refine the ROI in frame k based on the boundary pixels of the estimated ROI. The purpose of the tuning process is to detect any edges through a local search around these boundary pixels in order to determine the final ROI in frame k. The search domain for the tuning process, according to the present invention, consists of the coefficients of HL and LH subbands in the luminance space, which allow the extraction of vertical and horizontal edges, respectively (FIG. 3b). The use of the luminance component Y enables robust detection of edges even when the target region comes in contact with another region of the same color type. The pixel with a larger magnitude is likely to be an edge pixel. If the edge pixel happens to be in the background, then its color coefficients should be checked before including it in the ROI. Care must be taken not to include pixels of a different color in the contour region of the ROI. Such a pixel might lead to a propagation of errors when tacking is carried out for the entire image sequence.

Algorithm

After projecting the ROI contour of frame (k-1) to frame k, the search for the ROI in frame k is carried out in accordance with the following algorithm:

Loop over all "relevant" pixels $x_k(i,j)$ within the search area in frame k;
  Define a search window in frame (k-1) for each $x_k(i, j)$;
  Loop over all window pixels $x_{k-1}(p, q)$;
    Compute Euclidean distances $|w_k(i, j) - w_{k-1}(p, q)|$;
  Choose the minimum Euclidean distance for identifying $x_{opt}$;
  Determine the region status of $x_k(i, j)$ according to $x_{opt}$;
  Establish estimated ROI boundary based on region status of $x_k(i, j)$;
Loop over boundary pixels of the estimated ROI;
  Classify boundary type;
  Compare high-frequency coefficients and check color coefficients to decide on the edge pixel.

It should be noted that the arithmetic operations used in the above-described algorithm are additions and comparisons. No multiplication is required. Given the fact that the encoder already computes wavelet coefficients, the highest complexity in the algorithm is the search loops. Because the tracking is performed at a low resolution, and the target object generally occupies only a small portion of the image (required for compression efficiency), the average total number of loops is also small.

Figure 4:
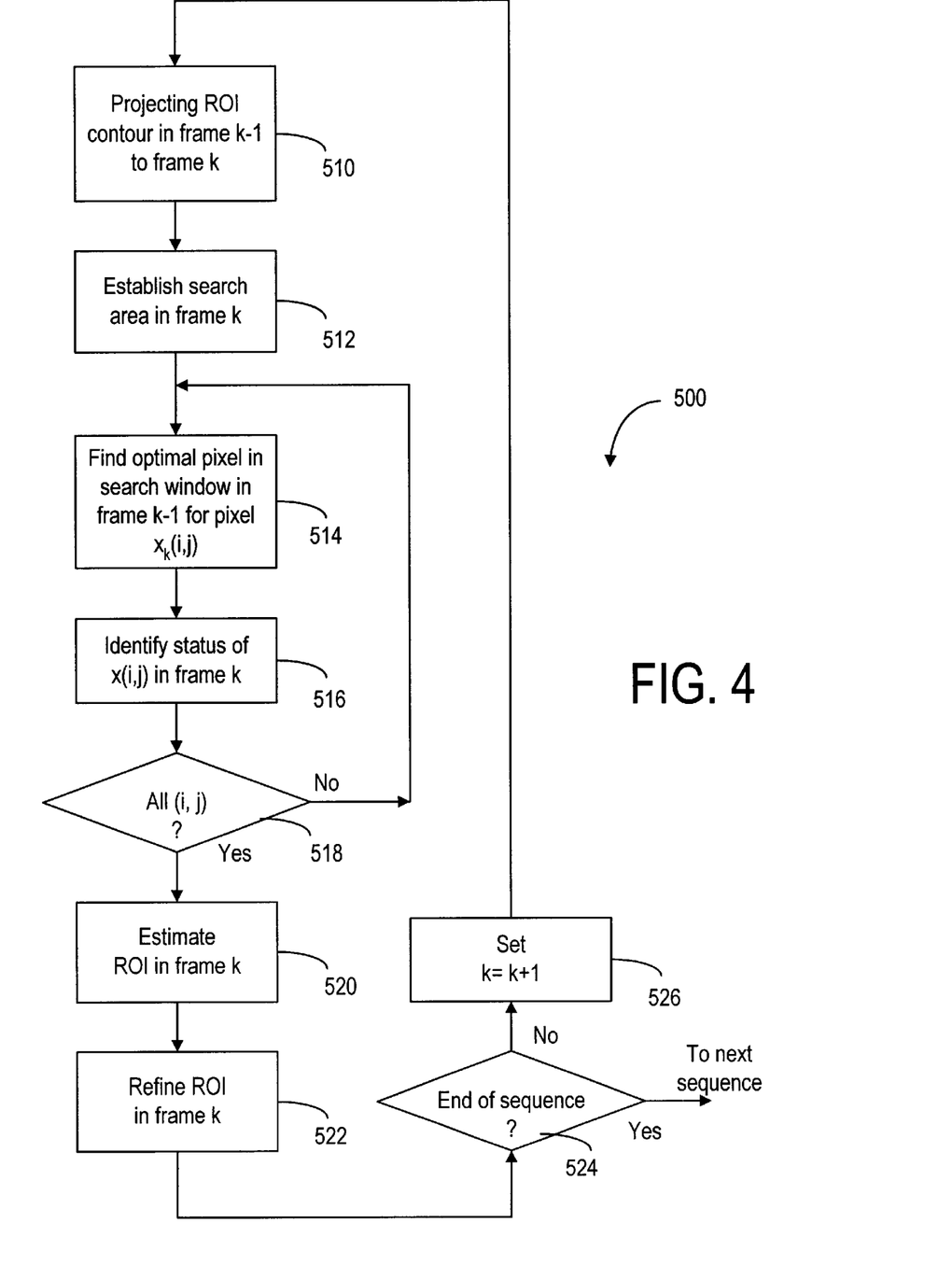
FIG. 4 is a flowchart illustrating the ROI search process, according to the present invention.

The method of tracking a target region within an image frame in a sequence of image frames, according to the present invention, is summarized in the flowchart 500, as shown in FIG. 4.

As shown in FIG. 4, the ROI contour in frame (k-1) is projected onto frame k at step 510. A search area including a plurality of pixels in frame k enclosing the projected ROI contour is established at step 512. For each pixel $x_k(i,j)$ within the search area, an optimal pixel $x_{k-1}(p, q)$ within a search window in frame (k-1) is determined based on the Euclidean distance at step 514. The region status of $x_k(i,j)$ is determined based on the corresponding optimal pixel at step 516. If the region status of every $x_k(i,j)$ within the search area is determined as decided at step 518, then an estimated ROI in frame k based on the region status of $x_k(i,j)$'s is established at step 520. Using the high-frequency subbands in the luminance space to detect the edge pixels around the estimated ROI boundary in order to refine the ROI in frame k is carried out at step 522. If it is decided at step 524 that the current frame k is the last frame of the sequence, then the process continues to the next sequence. Otherwise, the process loops back to step 510 for determining the ROI in the next frame.

Figure 5:
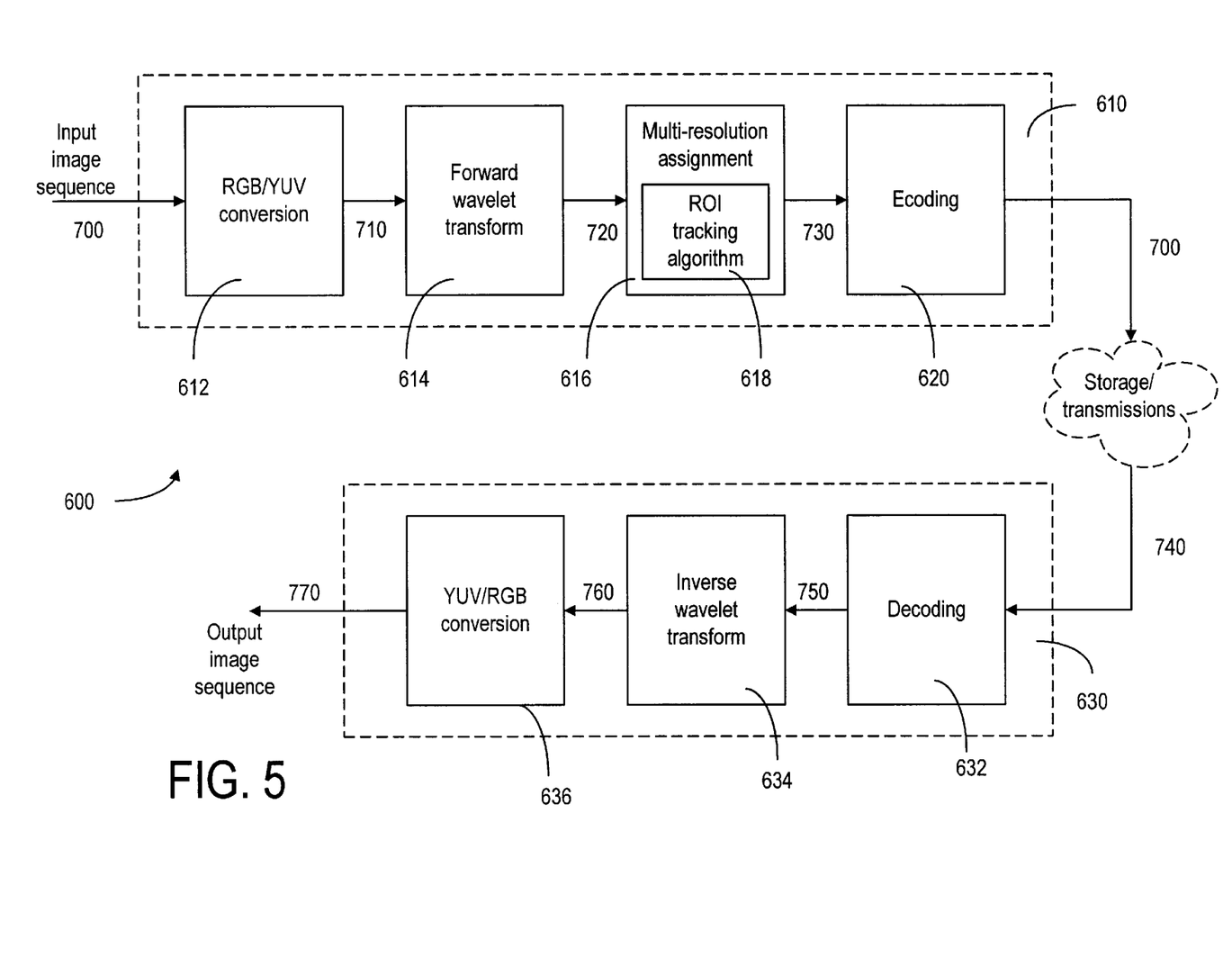
FIG. 5 is a block diagram illustrating an image coding system capable of ROI tracking, according to the present invention.

An image coding system that is capable of carrying out the target region tracking method, according to the present invention, is shown in FIG. 5. The image coding system 600 comprises an encoder 610 and a decoder 630. As shown in FIG. 5, an image sequence 700 consisting of a plurality of digital image frames, each separable into three color planes (R, G, B), is provided to a converter module 612. The converter 612 converts the digital image frames into a series of digital image frames 710 in YUV format. A forward wavelet transform module 614 is used to transform the pixels in each of the image frames 710 into wavelet coefficients in various subbands. The transformed image data 720 is provided to a multi-resolution assignment module 616 where more bits per pixel are assigned to important image regions within a frame. Preferably, the boundary of each important image region in the first frame is provided to a ROI tracking module 618 so that the important image region in subsequent frames can be automatically tracked. The ROI tracking module 618 uses the ROI tracking algorithm, according to the present invention, to determine the important image regions in subsequent frames. The multi-resolution image data 730 is conveyed to an encoding module 620 for encoding and compression. The codestream 740 can be transmitted in real-time or stored from future use. At the receiving end, the decoder 630 reconstructs the input image sequence 700 based on the codestream 740. As shown, a decoding module 632 is used to reconstruct the transformed data based on the codestream 740. The reconstructed transformed data 750 is transformed by an inverse wavelet transform module 634 into a series of digital image frames 760 in YUV space. After being converted by a conversion module 636, the image data becomes a series of digital images 770 in three color planes (R, G, B).

Simulation Results

The ROI tracking method, according to the present invention, has been used on three different image sequences: "MOBILE", "FOREMAN" and "IRENE". All sequences have a CIF-size (Common Intermediate Format) and a rate of 30 frames per second. In order to operate at lower rates, 3 frames are skipped at each tracking iteration in the "MOBILE" and "FOREMAN" sequences, and the tracking is performed at a rate of 7.5 frames per second. In the "IRENE" sequence, the original frame rate is kept.

In the "MOBILE" sequence, the ROI is a red ball with small surrounding white regions. The ball undergoes rotational and translational motions, back and forth, and comes in contact with other regions of similar colors.

In the "FOREMAN" sequence, the human face being tracked changes poses and positions. At the end of the sequence, an abrupt change of scene occurs and the target region is fully occluded.

In the "IRENE" sequence, two ROIs are chosen, each on a different hand of the speaker. The hands show a relatively fast variation of positions, poses and colors. The hands also overlap with other skin regions, such as the neck region, which makes the tracking even more difficult.

In the simulation, the ROI in is fed to the algorithm, in the first frame. At each iteration, only the wavelet transform of the previous frame is used. The search is performed at the second resolution (LL subband) and the upper boundary d is chosen to be equal to 6 pixels, whereas the search window size is 16 by 16 pixels (r=8). The upper boundary on the minimum Euclidean distance is 3 in the "MOBILE" and "FOREMAN" sequences. In the "IRENE" sequence, the upper boundary is not set in order to compensate for the changes in color in the ROI. In the "MOBILE" sequence, the main difficulty is the presence of many background regions with similar colors as the target. Some of these regions do not initially appear in the scene (full or partial inclusion). In the first frame, the target region doesn't include the whole ball, because only part of the ball appears. The simulation results show that the tracking algorithm is able to keep track of the ball throughout the video sequence. However, as iteration progresses, some of the background regions are included in the ROI. The included regions are very close to the target region in colors and positions and they are not initially in the scene.

In the "FOREMAN" sequence, the algorithm shows its ability to track the face despite the changes in facial poses in relatively fast motion during some periods of the sequence. As iteration progresses, the algorithm includes part of the neck in the ROI. The included region is connected to the face without a separating edge. A part of the wall is also included in the ROI due to similarity in color components. The simulation results also show the ability of the algorithm to detect full occlusion of the target region from the scene.

In the "IRENE" sequence both hands of the speaker are tracked at a rate of 30 frames per second. Such a target region is very difficult to track due to significant variations in positions, poses (flipping sides and different fingers positions) and colors. To overcome the problem of change in color, the upper boundary on the minimum Euclidean distance is relaxed. In some frames, both hands flipped sides. However, the algorithm is still able to track the ROI, missing only a part of the right hand. In some frames, a good tracking performance is achieved despite the overlap with the neck and face. When the hands move away from other skin regions, a significant part of the right hand associated with the background is missing. Eventually, the entire ROI on the right hand completely disappears. This is mainly because the right hand moves relatively fast and thus is more difficult to track. It should be noted that it is possible to include a feedback feature in the tracking algorithm to prevent the ROI from disappearing. For example, the search area and the search window can be increased if the ROI becomes progressively small over a certain number of frames.

The major advantage of the target region tracking method, according to the present invention, is that it does not rely on prior information regarding the region of interest. For example, in tracking a human face, the algorithm does not rely on specific characteristics such as color values, and eyes and mouth singularities. Usually, specific information is required offline through a training of the target. The tracking algorithm, according to the present invention, is suitable for a non-specific region-of-interest to be specified by a user.

ROI tracking is a useful functionality in an image codec, such as JPEG 2000. It allows the allocation of more bits in a target region than other regions in the image frame while coding the image frame. As such, a high visual quality around the target region can be achieved.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of tracking a target region in an image frame based on a target region of a previous image frame in a sequence of image frames, each of said sequence of image frames comprising a plurality of pixels, said method characterized by:

determining a search area in said image frame based on at least a part of the target region in said previous frame, said search area comprising a plurality of first pixels, each pixel having at least one corresponding first pixel value; and for the first pixels in the search area:
determining a further search area in said previous frame, said further search area including a plurality of second pixels among the plurality of pixels in the previous frames, each second pixel having at least one corresponding second pixel value and a region status;
finding a match between the first pixel value of said first pixels among the second pixel values for locating a reference second pixel; and
determining the region status of at least one of said first pixels based on the region status of the reference second pixel for determining the target region in said image frame based on the region status of said at least one first pixel.

2. The method of claim 1, wherein the region status of the second pixel is indicative of whether said second pixel is located within the target region in said previous frame.

3. The method of claim 1, wherein said at least a part of the target region in said previous frame has a contour for defining a corresponding contour in said image frame, and wherein the first pixels include pixels adjacent to the corresponding contour in said image frame.

4. The method of claim 1, wherein the target region of said image frame includes a boundary and said plurality of pixels in said image frame include a plurality of third pixels adjacent to the boundary, each third pixel having at least one corresponding third pixel value, said method further characterized by determining the edge-type of the third pixels so as to modify the target region in said image frame based on the edge-type of the third pixels.

5. The method of claim 4, wherein the edge-type is determined based on the luminance component of the wavelet coefficients.

6. The method of claim 1, wherein the first and second pixel values are indicative of wavelet coefficients.

7. The method of claim 1, wherein the first and second pixel values are indicative of wavelet coefficients in a low subband.

8. The method of claim 1, wherein the first and second pixel values are indicative of at least one of the chrominance components of the wavelet coefficients in a low subband.

9. The method of claim 4, wherein the third pixel values are indicative of wavelet coefficients.

10. The method of claim 4, wherein the third pixel values are indicative of wavelet coefficients in a high subband.

11. The method of claim 4, wherein the third pixel values are indicative of the luminance component of wavelet coefficients in a high subband.

12. A computer program for use in an image coder having means for coding a sequence of image frames into a codestream, said sequence of image frames having at least one first image frame and a preceding second image frame, each of the first and second image frames having a plurality of pixels, wherein the second image frame has a target region, said computer program characterized by:
   a code for defining a search area in the first image frame based on at least a part of the target region in the second image frame, said search area comprising a plurality of first pixels, each pixel having at least one corresponding first pixel value; and
   a code for determining, for the first pixels in the search area:
      a further search area in the second image frame, said further search area including a plurality of second pixels among the plurality of pixels of the second image frame, each of the second pixels having at least one corresponding second pixel value and a region status;
      a reference second pixel in said further search area based on a match between the first pixel value of said first pixels among the second pixel values; and
      the region status of at least one of said first pixels based on the region status of the reference second pixel for determining a target region in the first image frame based on the region status of said at least one first pixel.

13. The computer program of claim 12, wherein the first and second pixel values are indicative of at least one of the chrominance components of wavelet coefficients in a low subband.

14. The computer program of claim 12, wherein the target region of the first image frame includes a boundary and said plurality of pixels in the first image frame include a plurality of third pixels adjacent to the boundary, each third pixel having at least one corresponding third pixel value, said computer program further characterized by
   a code for determining the edge-type of the third pixels so as to modify the target region in the first image frame based on the edge-type of the third pixels.

15. The computer program of claim 14, wherein the third pixel values are indicative of the luminance component of wavelet coefficients in a high subband.

16. The computer program of claim 12, wherein the region status of the second pixel is indicative of whether said second pixel is located within the target region in the second image frame.

17. An image encoder for coding a sequence of image frames comprising at least one first image frame and a preceding second image frame, each of the first and second image frames including a plurality of pixels, the second image frame having a target region, said image encoder having:
   means for decomposing each of the image frames into a plurality of subband components; and
   means for coding the subband components into a codestream, said image encoder characterized by
   a first algorithm, responsive to the subband components, for defining a search area in the first image frame based on at least a part of the target region in the second image frame, the search area including a plurality of first pixels, each having at least one corresponding first pixel value; and
   a second algorithm, responsive to the first pixels, for determining:
      a further search area in the second image frame including a plurality of second pixels among the plurality of pixels in the second image frame, each second pixel having at least one corresponding second pixel value and a region status;
      a reference second pixel in the further search area based on a match between the first pixel value of the first pixels among the second pixel values; and
      a region status of at least one of the first pixels based on the region status of the reference second pixel for determining a target region in the first image frame based on the region status of said at least one first pixel.

18. The image encoder of claim 17, wherein the first and second pixel values are indicative of at least one of the chrominance components of the wavelet coefficients in a low subband.

19. The image encoder of claim 17, wherein the target region of the first image frame includes a boundary and said plurality of pixels in the first image frame include a plurality of third pixels adjacent to the boundary, each third pixel having at least one corresponding third pixel value, said computer program further characterized by
   a code for determining the edge-type of the third pixels so as to modify the target region in said image frame based on the edge-type of the third pixels.

20. The image encoder of claim 19, wherein the third pixel values are indicative of the luminance component of wavelet coefficients in a high subband.

21. The image encoder of claim 17, wherein the image encoder is adapted to code said target region in the first image frame with higher visual quality than another region in said first image frame.

22. An image coding system having an encoder for coding a sequence of image frames into a codestream, and a decoder for reconstructing the sequence of image frames based on the codestream, wherein the sequence of image frames comprising at least a first image frame and a preceding second image frame, each of the first and second image frames comprising a plurality of pixels, the second image frame having a target region, said image encoder having:
   means for decomposing each of the image frames into a plurality of subband components; and
   means for coding the subband components into the codestream, said image encoder characterized by
   a first algorithm, responsive to the subband components, for defining a search area in the first image frame based on at least a part of the target region in the second image frame, the search area including a plurality of first pixels, each having at least one corresponding first pixel value; and
   a second algorithm, responsive to the first pixels, for determining:

a further search area in the second image frame including a plurality of second pixels among the plurality of pixels in the second image frame, each second pixel having at least one corresponding second pixel value and a region status;

a reference second pixel in the further search area based on a match between the first pixel value of the first pixels among the second pixel values; and a region status of at least one of the first pixels based on the region status of the reference second pixel for determining a target region in the first image frame based on the region status of said at least one first pixel.

* * * * *